Nov. 21, 1961  D. M. ADAMS  3,009,185
WINDSHIELD WIPER BLADE
Filed Dec. 31, 1958
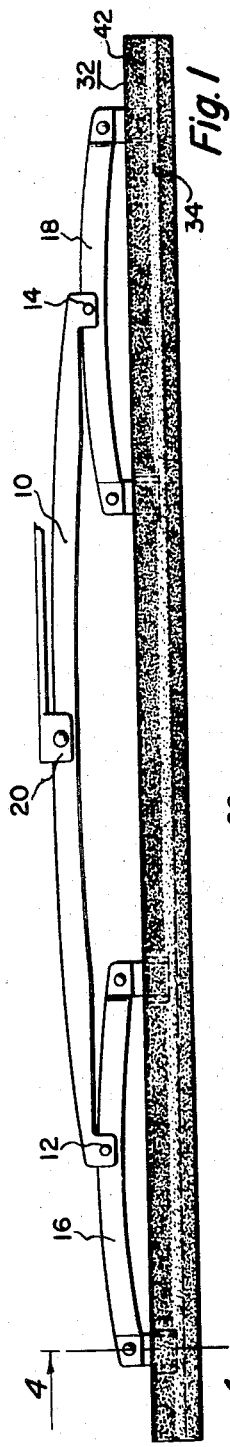
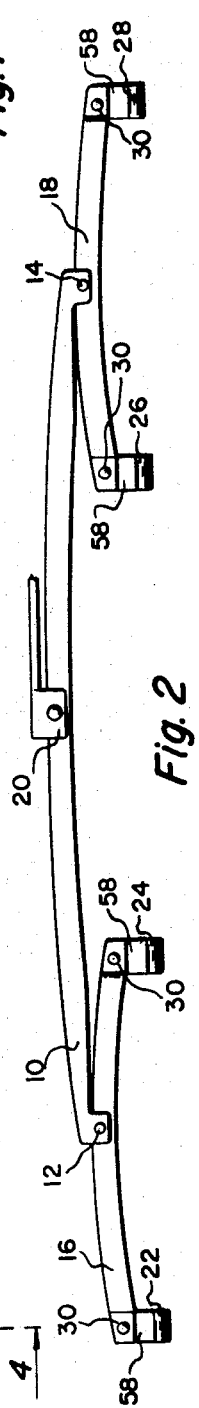
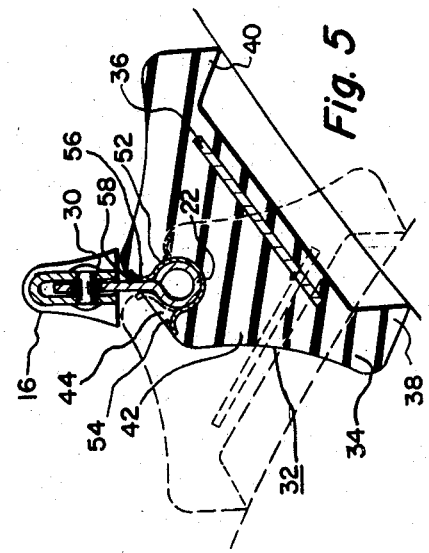
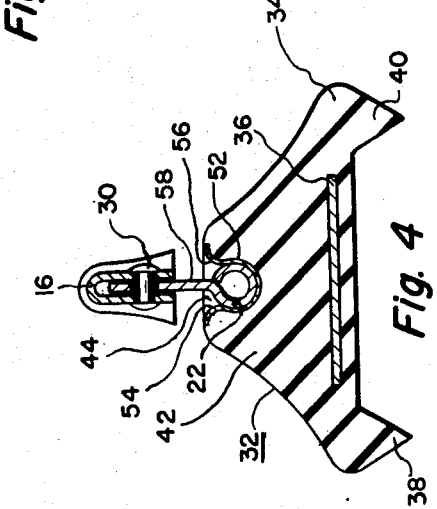
INVENTOR.
Daniel M. Adams
BY
His Attorney United States Patent Office 3,009,185
Patented Nov. 21, 1961

3,009,185
WINDSHIELD WIPER BLADE
Daniel M. Adams, Birmingham, Mich., assignor to General Motors Corporation, Detroit, Mich., a corporation of Delaware
Filed Dec. 31, 1958, Ser. No. 784,246
4 Claims. (Cl. 15—250.33)

This invention pertains to the art of windshield cleaning, and particularly to a wiper blade constructed to resist the lifting action of wind.

It is well recognized that high velocity wind currents frequently lift a wiper blade off the windshield during oscillation of the blade thereby causing the blade to fail to perform in its designed manner. The lifting action of wind currents is more pronounced on curved windshields, and the problem has become acute due to the necessity of using flexible wiper blades. Heretofore, it has been proposed to incorporate a wind thrust member, or surface, on the wiper blade such that the wind acting thereon produces a force having a component tending to urge the wiper blade against the windshield, and thus prevent wiper blade lift due to wind currents. In other words, in the prior art devices of which I am aware, wind pressure is utilized to assist the wiper arm in maintaining the wiper blade against the windshield. The present invention relates to a new concept and means for preventing lifting of the wiper blade due to high velocity wind currents inasmuch as the wiper blade is designed and constructed so that air flowing across the squeegee element and pressure distributing linkage does not produce a lifting force on the wiper blade.

Accordingly, among my objects are the provision of a windshield wiper blade having a low profile squeegee element; the further provision of a windshield wiper blade having a squeegee element with spaced dual wiping lips; the further provision of a flexible windshield wiper blade adapted to conform to curved surfaces under the application of arm pressure which is designed and constructed to resist wind lifting; and the still further provision of a wind lift resistant flexible wiper blade assembly including a flexible squeegee unit and a pressure distributing linkage operatively connected to the squeegee unit so as to permit tilting movement of the squeegee unit relative to the linkage.

The aforementioned and other objects are accomplished in the present invention by utilizing a low profile elastomeric wiping element having a flexible backing strip imbedded therein so as to form a squeegee unit which is pivotally connected with the pressure distributing linkage. Specifically, the wind resistant wiper blade assembly comprises an elastomeric wiping element having a pair of spaced wedge-shaped wiping lips, or edges, and a suitably contoured retention portion which resists wind lift. A spring metal backing strip having a greater width than thickness, so as to be freely flexible in a plane normal to the surface to be wiped but substantially inflexible in a plane parallel to the surface to be wiped, is imbedded in the wipping element. The flexible metal backing and the wiping element constitute the squeegee unit. The squeegee unit includes a plurality of spaced semi-cylindrical sockets having suitable metallic liners in the retention portion thereof which receive pivots attached to the free ends of the pressure distributing linkage. The pivots cooperate with the sockets to limit tilting movement of the squeegee unit relative to the pressure distributing linkage, while permitting the squeegee unit to assume the proper drag, or position relative to the windshield during oscillatory movement thereacross.

The pressure distributing linkage may be of any suitable known type, and as shown in the embodiment disclosed herein comprises a primary yoke which receives arm pressure and a pair of secondary yokes pivotally connected to the ends of the primary yoke. The ends of the secondary yokes carry the pivots which are received in the spaced sockets of the squeegee unit. In order to prevent the wind from producing lifting action on the pressure distributing linkage, both the primary and the secondary yokes have a flared channel-shaped cross-section whereby the air moving across the squeegee unit and the pressure distributing linkage will not produce a lifting force.

In the drawing:

FIGURE 1 is a side view in elevation of a wiper blade constructed according to this invention.

FIGURE 2 is a side view in elevation of the pressure distributing linkage.

FIGURE 3 is a side view in elevation of the squeegee unit.

FIGURE 4 is an enlarged, sectional view taken along line 4—4 of FIGURE 1.

FIGURE 5 is an end view of the wiper blade depicting one of the extreme tilted positions of the squeegee unit in full lines and the other extreme tilted position in dotted lines.

With particular reference to FIGURE 1, a wiper blade is shown including a pressure distributing linkage or surface conforming support, comprising a primary yoke 10, opposite ends of which are pivotally connected at 12 and 14 to secondary yokes 16 and 18. This type of pressure distributing linkage is shown only by way of example, since it is readily apparent that other types of pressure distributing linkages may be employed without departing from the scope of the present invention. The primary yoke 10 carries a connector 20 to which a spring biased wiper arm can be attached in a conventional manner. The wiper arm, not shown, applies wiping pressure to the blade urging it into engagement with the windshield surface to be cleaned.

As seen particularly in FIGURE 2, the secondary yokes 16 and 18 have pivots 22, 24, 26 and 28 carried by the standards 58 attached to the free ends thereof. The pivots 22 through 28 are somewhat elongate and are rigidly connected to the pressure distributing linkage, by any suitable means, such as rivets 30.

The wiper blade also includes a squeegee unit indicated generally by the numeral 32, which as shown in FIGURES 3 and 4 includes an elongate elastomeric wiping element 34 having imbedded therein a flexible metal backing strip 36. The wiping element, as shown, has a greater width than height. The backing strip 36 has a greater width than thickness so as to be freely flexible in one plane and substantially inflexible in a plane at right angles thereto. The plane of flexibility of the backing strip 36 is, of course, arranged substantially normal to the surface to be cleaned. The wiping element 34 includes a pair of spaced wiping lips 38 and 40 and a contoured low profile retention portion 42, the retention portion 42 is formed with four longitudinally spaced sockets 44, 46, 48 and 50 adapted to receive pivots 22 through 28, respectively.

The sockets include metallic liners 52 of semicylindrical configuration, the terminal portions 54 and 56 of which are engageable with the standards 58 supporting the pivots to limit tilting movement of the squeegee unit relative to the pressure distributing linkage and enabling the squeegee unit to assume the proper drag position relative to the pressure distributing linkage during movement across the windshield surface. The construction of the sockets may be similar to that shown in copending application Serial No. 580,207 Easterling, filed April 24, 1956 and assigned to the assignee of the present invention, and accordingly, the pivots connections, per se, between the pressure distributing linkage and the squeegee unit constitute no part of this invention.

Referring particularly to FIGURES 4 and 5, it can be seen that the secondary pressure distributing members, namely secondary yokes 16 and 18, have a generally flared channel-shaped cross-sectional configuration which results in a substantially smooth, or laminar flow of air across the contoured low profile surface of the squeegee unit and the pressure distributing linkage so that high velocity air currents flowing across the wiper blade in the direction of arrows 60 will not produce a lifting force. The primary yoke 10 has a cross section similar to that of the secondary yokes 16 and 18. In addition, by utilizing a wiping element having spaced apart wiping lips, in combination with the pivot and socket assembly which limits tilting movement of the squeegee unit relative to the pressure distributing linkage, engagement of the metallic parts of the pressure distributing linkage with the windshield surface will be precluded.

While the embodiments of the invention as herein disclosed constitutes a preferred form, it is to be understood that other forms might be adopted.

What is claimed is as follows:

1. A wiper blade assembly including, a low profile squeegee unit flexible in a plane normal to the surface to be wiped including, a wiping element having a pair of spaced apart edges along one margin and a retention portion, said wiping element having contoured surfaces connecting the retention portion and the wiping edges to resist wind lift, said squeegee unit also including a flexible backing having a greater width than thickness, said wiping edges being spaced apart a greater distance than the width of said backing, and a pressure distributing superstructure including a plurality of relatively movable members operatively connected to the retention portion of said squeegee unit for applying conforming pressure thereto.

2. The wiper blade assembly set forth in claim 1 wherein said members of the pressure applying superstructure have a flared channel-shaped cross-section so as to resist wind lift.

3. The combination set forth in claim 2 wherein said pressure applying superstructure includes a primary pressure distributing member and at least one secondary pressure distributing member, and wherein the connections between said pressure applying superstructure and said squeegee unit permit tilting movement of the squeegee unit relative to the pressure applying superstructure.

4. A wiper blade assembly including an elongate, flexible, low profile wiping element having a pair of spaced wiping edges along one margin and a retention portion along the opposite margin, said wiping element having contoured surfaces connecting the retention portion and the wiping edges so as to resist wind lift, the wiping edges being spaced apart a greater distance than the width of said retention portion, and a surface conforming support operatively connected with said wiping element for applying conforming pressure thereto.

References Cited in the file of this patent
UNITED STATES PATENTS

| | | |
|---|---|---|
| 2,543,383 | Scinta et al. | Feb. 27, 1951 |
| 2,700,785 | Oishei et al. | Feb. 1, 1955 |
| 2,751,619 | Chambers | June 26, 1956 |
| 2,782,448 | Anderson | Feb. 26, 1957 |